United States Patent [19]

Keeler et al.

[11] Patent Number: 5,241,314
[45] Date of Patent: Aug. 31, 1993

[54] IMAGE LIDAR TRANSMITTER DOWNLINK FOR COMMAND GUIDANCE OF UNDERWATER VEHICLE

[75] Inventors: R. Norris Keeler, McLean, Va.; Charles H. Kaman, Farmington, Conn.; Bobby L. Ulich; Silvio A. Cardero, both of Tucson, Ariz.; Robert S. Manthy, Windsor, Conn.

[73] Assignee: Kaman Aerospace Corporation, Bloomfield, Conn.

[21] Appl. No.: 789,170

[22] Filed: Nov. 6, 1991

Related U.S. Application Data

[63] Continuation-in-part of Ser. No. 760,872, Sep. 16, 1991, abandoned, which is a continuation-in-part of Ser. No. 746,645, Aug. 16, 1991, abandoned.

[51] Int. Cl.$^5$ .................... G01S 13/86; G01S 15/89; G01S 13/89
[52] U.S. Cl. .................... 342/54; 358/103; 367/88; 114/21.2; 114/21.3; 89/1.54; 342/25; 342/62; 342/13; 342/68
[58] Field of Search .................... 342/25, 54, 64, 13, 342/62, 68; 358/103, 99, 108, 109; 367/88, 95, 96, 197, 119, 131, 134, 145, 146, 147; 89/1.54; 114/21.2, 21.3; 356/1, 2, 4, 51

[56] References Cited

U.S. PATENT DOCUMENTS

| | | | |
|---|---|---|---|
| 4,030,096 | 6/1977 | Stevens et al. | 342/90 |
| 4,088,978 | 5/1978 | Gilmour | 367/88 |
| 4,802,148 | 1/1989 | Gilmour | 367/88 |
| 4,912,685 | 3/1990 | Gilmour | 367/88 |
| 5,022,015 | 6/1991 | Gilmour | 367/124 |
| 5,042,942 | 8/1991 | Brimberg et al. | 356/1 |
| 5,043,951 | 8/1991 | Gilmour et al. | 367/126 |

Primary Examiner—John B. Sotomayor
Attorney, Agent, or Firm—Fishman, Dionne & Cantor

[57] ABSTRACT

An underwater maneuverable vehicle is presented which carries an explosive charge and can be used for immediate removal or destruction of various menaces to navigation and other underwater hazards. The battery powered vehicle is air dropped from a platform which carries an imaging lidar system for detection and is operated and navigationally controlled in conjunction with an imaging lidar system. In accordance with an important feature of this invention, an optical lidar downlink is used to control the submerged underwater maneuverable vehicle from an airborne platform. The downlink is pulse spaced modulated. Command signals are secure, and are decoded aboard the vehicle. Control in speed, heading and depth, as well as command detonation are available using this technique.

29 Claims, 15 Drawing Sheets

IMAGE LIDAR TRANSMITTER DOWNLINK FOR COMMAND GUIDANCE OF UNDERWATER VEHICLE

CROSS-REFERENCE TO RELATED APPLICATION

This is a continuation-in-part of application Ser. No. 760,872 filed Sep. 16, 1991, which in turn is a continuation-in-part of application Ser. No. 746,645 filed Aug. 16, 1991 both now abandoned.

BACKGROUND OF THE INVENTION

This invention relates generally to a sensor system for remote detection and imaging of objects submerged underwater and an underwater vehicle guided by the sensor system for removing submerged navigational hazards. More particularly, this invention relates to a method and apparatus for detecting, locating, imaging and removing (e.g., destroying) underwater objects such as mines by use of an underwater self-propelled vehicle which is guided from an airborne platform using a novel imaging lidar (light detection and ranging) system and which is controlled by an optical downlink lidar.

It is desirable in a number of military and civilian applications to search a volume within a backscattering medium for the presence of certain targets. For instance, moored or bottom mines deployed in ocean shipping lanes are a hazard to navigating ships used both for military and for commercial purposes. For other civilian applications such as law enforcement on the ocean, it is desirable to detect the presence of submerged fishing nets or drug-carrying containers used in smuggling contraband. In or near harbors and beaches, it is also desirable to detect submerged obstructions, anchors, cables, abandoned pipelines, barrels, oil drums, etc. In strictly military applications, anti-submarine warfare demands an effective means of detecting and locating submarines.

Presently, cumbersome and time consuming wire line devices must be used for detecting underwater targets from remote airborne locations. These devices are lowered into the water and of course, are easily subject to damage and loss. Also, wire line devices make target searching relatively slow and can only detect targets without providing visual imaging.

An improved and novel system for remote detection and imaging of objects underwater (or objects obscured by other backscattering media which is at least partially transmitting to light such as ice, snow, fog, dust and smoke) from an airborne platform has been described in U.S. Pat. No. 4,862,257 and U.S. Pat. No. 5,013,917, both of which are assigned to the assignee hereof and incorporated herein by reference. The imaging lidar system of U.S. Pat. No. 4,862,257 utilizes a laser to generate short pulses of light with pulse widths on the order of nanoseconds. The laser light is expanded by optics and projected down toward the surface of the water and to an object or target. U.S. Pat. No. 5,013,917 relates to an imaging lidar system intended for night vision.

Imaging lidar systems of the type described hereinabove are also disclosed in commonly assigned U.S. Pat. No. 4,964,721, and U.S. Pat. No. 4,967,270, both of which are incorporated herein by reference. U.S. Pat. No. 4,964,721 relates to an imaging lidar system which controls camera gating based on input from the aircraft on-board altimeter and uses a computer to thereby adjust total time delay so as to automatically track changing platform altitude. U.S. Pat. No. 4,967,270 relates to a lidar system employing a plurality of gated cameras which are individually triggered after preselected time delays to obtain multiple subimages laterally across a target image. These multiple subimages are then put together in a mosaic in a computer to provide a complete image of a target plane preferably using only a single light pulse.

U.S. Ser. No. 565,631 filed Aug. 10, 1990 which is also assigned to the assignee hereof and fully incorporated herein by reference, relates to an airborne imaging lidar system which employs a plurality of pulsed laser transmitters. a plurality of gated and intensified array camera receivers, an optical scanner for increased field of regard, and a computer for system control, automatic target detection and display generation. U.S. Ser. No. 565,631 provides a means for rapidly searching a large volume of the backscattering medium (e.g., water) for specified targets and improves upon prior art devices in performance as a result of having more energy in each laser pulse (due to simultaneous operation of multiple lasers) and a more sensitive detection system using multiple cameras. The several cameras may be utilized to image different range gates on a single laser pulse or several cameras can be gated on at the same time to provide independent pictures which can then be averaged to reduce the noise level and improve sensitivity. Both of these improvements result in higher signal-to-noise ratio and thus higher probability of detection or greater range of depth capability.

Still other imaging lidar systems are disclosed in U.S. Pat. Nos. 5,029,009 and 5,034,810, both of which are assigned to the assignee hereof and incorporated herein by reference.

While the imaging lidar systems described above are well suited for their intended purposes and are successfully utilized to detect various underwater and drifting obstructions, there is a need for a device to actually destroy these obstructions once located. Presently, it is very expensive and time consuming to effect destruction of underwater hazards such as mines and the like; and the systems used to destroy such hazards often lack the required precision and accuracy. In some applications, it is customary to use divers to remove the underwater hazards. It will be appreciated that such use of divers can be dangerous and time consuming.

SUMMARY OF THE INVENTION

The above-described and other drawbacks and deficiencies of the prior art are overcome or alleviated by the present invention which affords an inexpensive and efficient means of identifying and destroying floating, submerged and suspended navigational obstructions using a battery powered underwater vehicle deployed from an airborne platform and guided by an imaging lidar system supported by the airborne platform.

More particularly, the present invention comprises an air launched submersible vehicle which can be launched, for example, from the sonobuoy carrying racks of a rotary wing aircraft (or any other suitable airborne platform). Upon identification and classification of the target by the imaging lidar system, the submersible vehicle is ejected from the carrying rack upon command. A vehicle drogue parachute is then deployed. Upon impact with the water, guidance is activated and the high explosive charge is fully armed. This vehicle (now in the water) is provided the depth of the target and leaves a trailing wire or buoy afloat for communications (or alternatively uses a raised antenna which extends above the water line); and is initially guided to the vicinity of the target automatically by radio signals from the computer associated with the imaging lidar system. Alternatively, the underwater vehicle can be hardwired directly to the airborne platform using a fiber optic cable. In yet another alternative described more fully below, the underwater vehicle is controlled directly by the lidar system itself using an optical downlink lidar. When the target and the underwater vehicle are both imaged simultaneously on the screen, the vehicle is then guided to the target by the same signals transmitted through the trailing wire antenna. The vehicle automatically maintains the depth of the target making the homing problem two dimensional.

Initially, the vehicle will travel in a random direction. The imaging computer (associated with the imaging lidar system on-board the airborne platform) uses the vehicle's motion relative to the fixed target (eliminating the effects of imaging platform motion) to determine its course. The relative location of the two objects is used to determine the required course for intercept. The difference between actual and required courses will be corrected by the computer's issuance of a steering command to the left or right for the appropriate number of seconds. Following a short, post-steer stabilization period, required and actual courses will be recomputed and the process repeated. These iterations allow automatic homing of the vehicle to target with no vehicle communication back to the host platform or on-board guidance.

Detonation of the explosive payload is also preferably controlled by the computer on-board the airborne platform. By projecting the future position of the vehicle relative to the target, the computer can determine the closest point of approach and send a detonation signal accordingly. Should the closest point of approach be beyond the "assured kill" radius, no detonation signal will be sent. The vehicle will simply pass by the target and automatically reengage as new required courses are computed and steering commands issued. A contact fuse may also detonate the vehicle on impact with the target. Should the vehicle fail to make "contact" with the target and thus fail to detonate, the high explosive may then be detonated by a salvage fuzing at the end of its propulsion cycle or after passing below a preselected depth.

In the backup mode of operation, the video console operator expands the field of his target image until the vehicle is detected. At this time, the console operator activates depth control, which automatically positions the vehicle at the depth of the target. Guidance consists of sequential commands to the vehicle rudder. Upon approach to the target, a high explosive or shaped charge is detonated on command from the console operator, thereby destroying the target.

The deployment of the wire antenna (or pop-up antenna) from the underwater vehicle places operational limits on the vehicle. In accordance with an important feature of the present invention, the imaging lidar sensor system itself is used to control the movement of the vehicle. During use, the laser illumination of the imaging lidar system is normally transmitted at regular intervals. However, for control purposes, the illuminating light from the laser transmitter is transmitted at intervals centered around its normal pulse repetition rate. The exact time of transmission is set by a coder, which causes transmission to take a short time interval before or after the normal transmission time. The vehicle employs a photodetector to convert the laser light to pulses of electrical energy. These signals are then decoded, and provide the commands to the various propulsion components of the vehicle.

It will be appreciated that while the above-described optical downlink may employ the imaging laser to send the communications signals, in an alternative embodiment, a second command laser may be utilized to send the command signals. This command laser would be boresighted to the imaging laser.

In a preferred embodiment, seven options are possible for control of the vehicle; turn right, turn left, go up, go down, increase speed, decrease speed, scuttle and detonate explosive charge. Where depth control is automatic, and not controlled from the platform, coded depth control signals are not needed. The depth is preset before launch, relying on accurate depth information provided from the lidar system. Speed increase and decrease are not required when speed is set at a constant value. For actual use, the number of different signals to be sent can be as low as three. It should be noted that the operation of the lidar transmitter in a coded mode is carried out simultaneously with the imaging operation. The two operations are completely independent and do not interfere with one another in any way.

A number of variations on the preferred embodiment are described. Either shaped charges or insensitive high explosive charges are used, depending on the nature of the target. When the target is floating, the vehicle is set for positive buoyancy, eliminating the need for internal independent depth control.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1A:
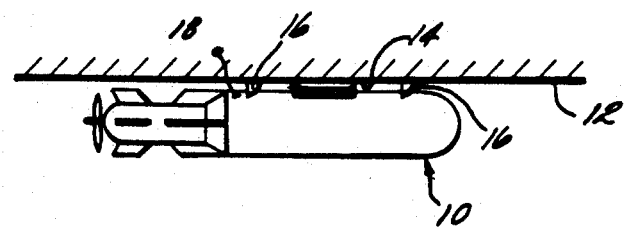
FIGS. 1A-1F are sequential side elevation views depicting the launching of the vehicle from an airborne platform and deployment against a surface target in accordance with the present invention.

The present invention comprises an underwater maneuverable vehicle which carries an explosive charge and is used for immediate removal or destruction of various menaces to navigation and other underwater hazards. The battery powered vehicle is air dropped from a platform (e.g., helicopter) which carries an imaging lidar system for detection of the underwater hazard. The underwater vehicle is operated and navigationally controlled in conjunction with the lidar system. Alternatively, the submerged maneuverable vehicle may also be navigationally controlled by imaging sonar or a similar imaging system.

Referring now to TABLE 1, the various modes of deploying the present invention are shown (with the exception of those modes employing a lidar downlink communications scheme as described more fully in FIGS. 8-16).

TABLE 1

|  | Surface Mode | Submerged Mode | Bulk Explosive | Shaped Charge |
|---|---|---|---|---|
| Communications | Pop Up Antenna | Floating Wire/Buoy |  |  |
| Buoyancy | Positive | Negative/Neutral |  |  |
| Flooding | Set[1] | Set[2] |  |  |
| Depth Control | None[3] | Set |  |  |
| Course Control | Operator (Rudder) | Operator |  |  |
| Detonation | Command | Command (Auto) | Command | Auto |
| Fuzing | On Water | Depth - 10 |  |  |
| Firing |  |  | Proximity | Proximal Bearing |

[1]Flooding port closed by command at launch for surface deployment.
[2]Flooding port normally open. No command required.
[3]No depth control used for surface action. Note, if set depth is deeper than three (3) feet, depth control is used.

Two principal operating modes are shown in TABLE 1 including (1) the surface mode where floating obstructions are encountered and destroyed; and (2) the underwater mode where targets floating, bottomed or moored a significant distance below the water must be removed. In the surface mode of operation (FIGS. 1A-1F and 2), console settings are initially provided for flooding, fusing and antenna deployment. The vehicle is then released from the platform and is slowed before entry to the water by a small drogue parachute, which is detached upon water entry. In this surface mode of operation, a small pop-up antenna is deployed and the vehicle propulsion motor is activated. Immediate activation is not necessary, as propulsion for depth control is not required. Should it be deemed advantageous to maintain a negative buoyancy at all times, the flooding ballast approach will not be used but rather, the automatic depth control will be set to maintain the vehicle at or slightly below the surface for all target depths. When the vehicle is acquired by the imaging lidar system on-board the platform, the propulsion motor is activated on command and guided to the vicinity of the target. Guidance is accomplished automatically by the imaging computer or manually with the operator observing the image of the target and the vehicle on the video screen of the lidar system and manually guiding the vehicle to the vicinity of the target. Upon reaching the closest point of approach, the explosive or shaped charge is detonated by computer signal or operator command. Additional instruction may be used for correct orientation of a shaped charge, particularly at depths below the surface.

For targets below the surface (FIGS. 3A-D and 4A-B), the vehicle flooding ports remain open, and the depth of the target is set in. The depth is determined from the imaging lidar; it is set at the depth where the target becomes obscuring, rather than reflective. The vehicle is launched, the drogue chute is deployed and the vehicle enters the water. The free flooding area is flooded, since the ports have not been closed, and the vehicle now has slightly negative buoyancy. The vehicle begins to swim downward, with the explosive fusing some ten feet above the set depth. At the same time, the floating wire antenna is deployed. The vehicle is guided in azimuth as before, with a horizontal stabilizer providing depth control. The free flooding ports (if this option is used) are closed, so that the vehicle retains positive buoyancy. Using the video presentation, the vehicle is guided to the target as before by RF signals received through the floating antenna. The explosive charge is detonated at the time the operator sees the vehicle approach the target closely enough for it to break up.

Turning now to FIGS. 1A-F, the above-described sequence for vehicle launch against a surface target is shown. Referring to FIG. 1A, a submersible vehicle 10 in accordance with the present invention is shown mounted on a platform 12 attached to a rack 14 by clamps 16.

Figure 1B:
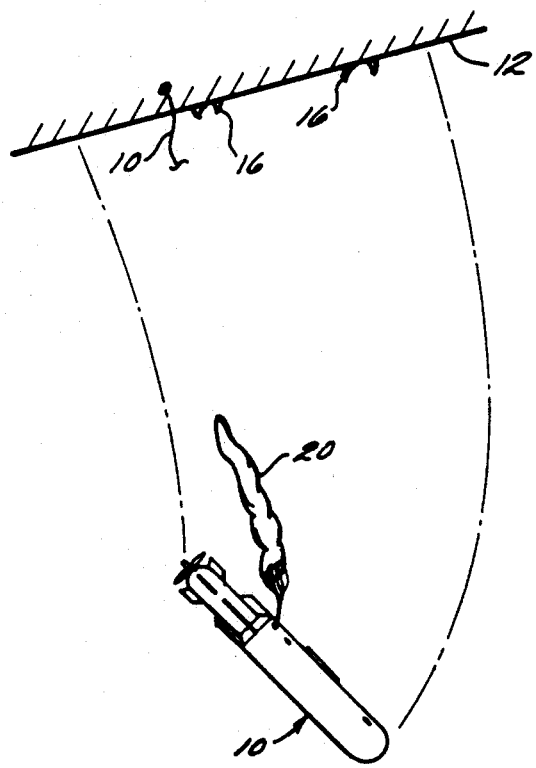
Figure 1B:
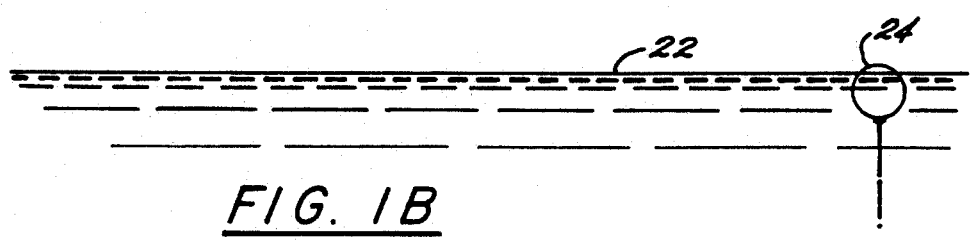
Figure 1C:
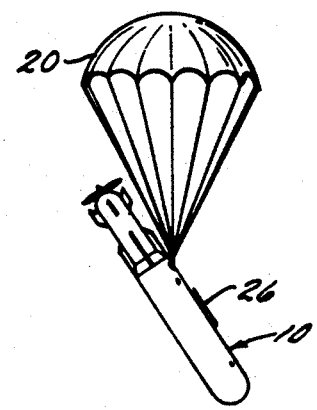
Figure 1D:
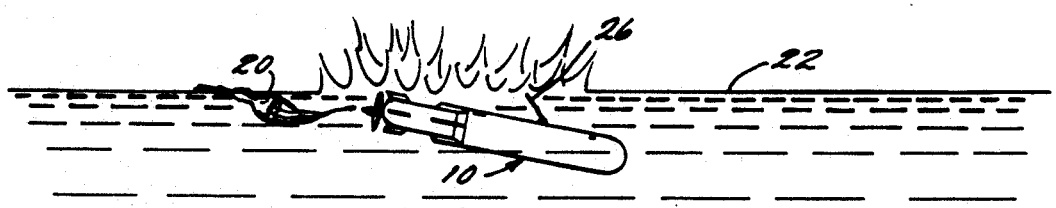
Figure 1E:
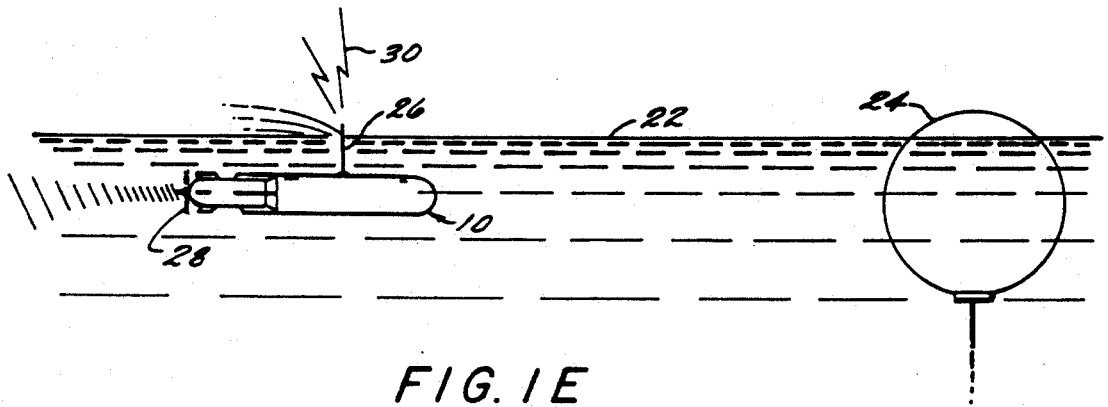
Figure 1F:
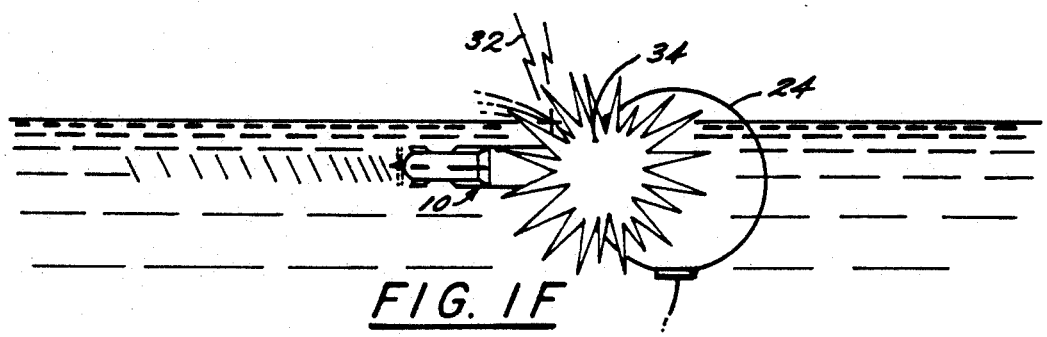

Instructional inputs to vehicle 10 at launch are provided by an umbilical cord 18 which communicates with an on-board command computer associated with an imaging lidar system (which is also on-board platform 12). In FIG. 1B, clamps 16 have released, vehicle 10 has left rack 14, the umbilical cord 18 is detached and a drogue chute 20 is beginning to deploy as the vehicle approaches water 22 on which a target 24 is floating. As shown in FIG. 1C, drogue chute 20 is not fully deployed, slowing the fall of the vehicle to the water surface. At this time, the console settings (see FIG. 5) are for deployment of a pop-up antenna 26. Therefore, no depth control, closure of the flooding ports, and fusing are required to set on water entry. In FIG. 1D, vehicle 10 has entered water 22 and shed the drogue chute 20. Pop-up antenna 26 is in place and ready to receive rf signals. FIG. 1E shows vehicle 10 under power via propeller 28 receiving rf steering commands 30 from the console operator who now views both target 24 and vehicle 10 images on a real time video screen as will be shown in FIG. 2. In FIG. 1F, a detonation command 32 has been sent, the explosive or shaped charge has exploded at 34 and the target 24 has been destroyed. The console operator then observes the debris or fragments of target 24 as they slowly disperse, indicating the complete destruction of the navigational hazard.

In the event that the flooding ports do not close, automatic depth control will commence at a depth of three feet, and the floating antenna will deploy (see FIGS. 3A-D). These actions are initiated by a depth sensor (see FIG. 6).

In accordance with the present invention, any suitable imaging sensor may be used to control and simultaneously view the underwater vehicle and the target. Examples of suitable imaging sensors include imaging lidar systems and imaging sonar systems. Preferably, an imaging lidar system of the type discussed in the Background Section (such as U.S. Pat. Nos. 4,862,257, 4,964,721, 4,967,270, 5,013,917, 5,029,009, 5,034,810 or U.S. Ser. No. 565,631) is employed in the present invention. As already discussed, imaging systems of this type image a volume of water using a pulsed laser transmitter in combination with one or more gated cameras.

Figure 2:
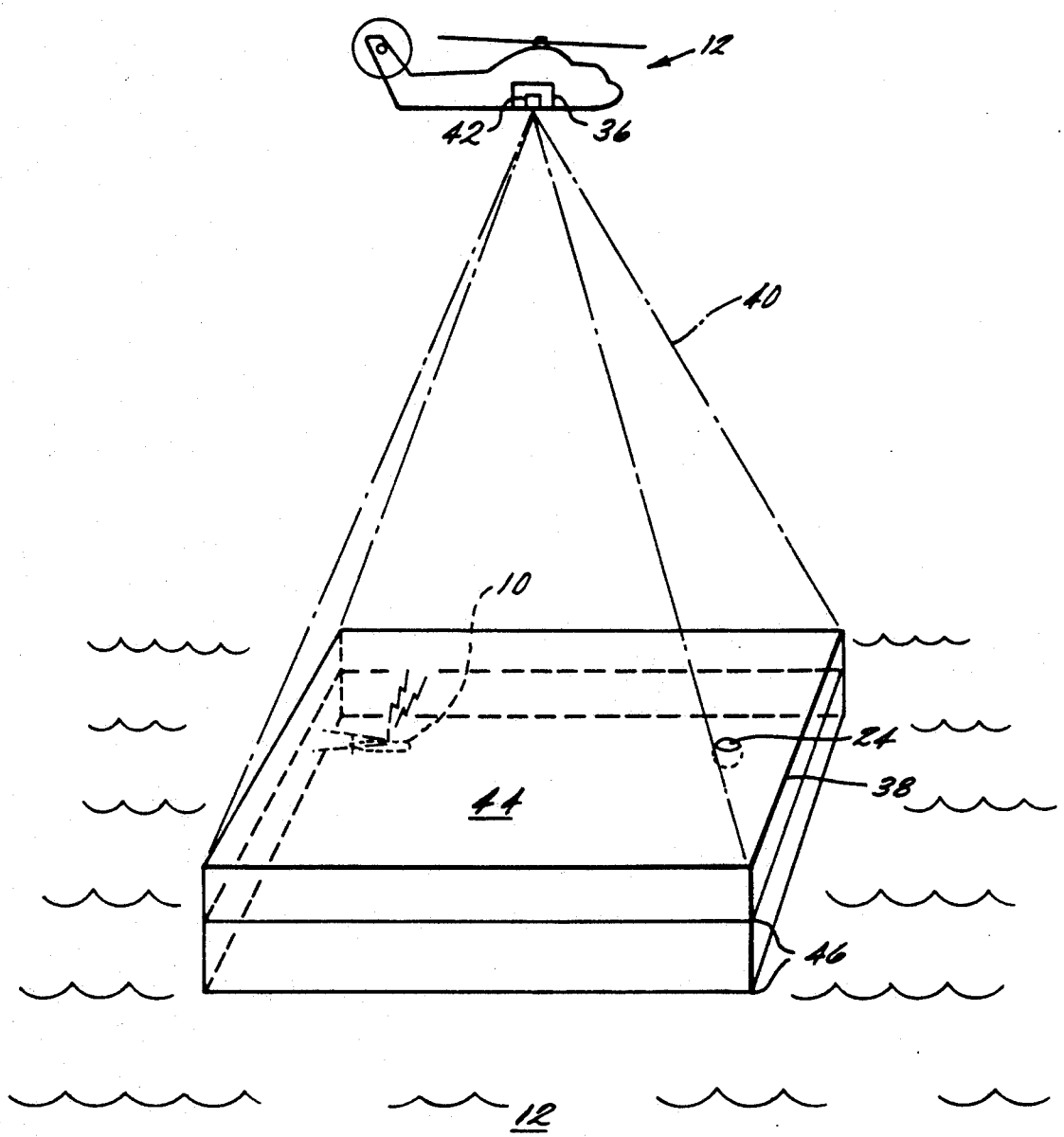
FIG. 2 is a diagrammatic view showing the use of a lidar imaging system in guiding the vehicle to a floating surface target in accordance with the present invention.
Figure 2A:
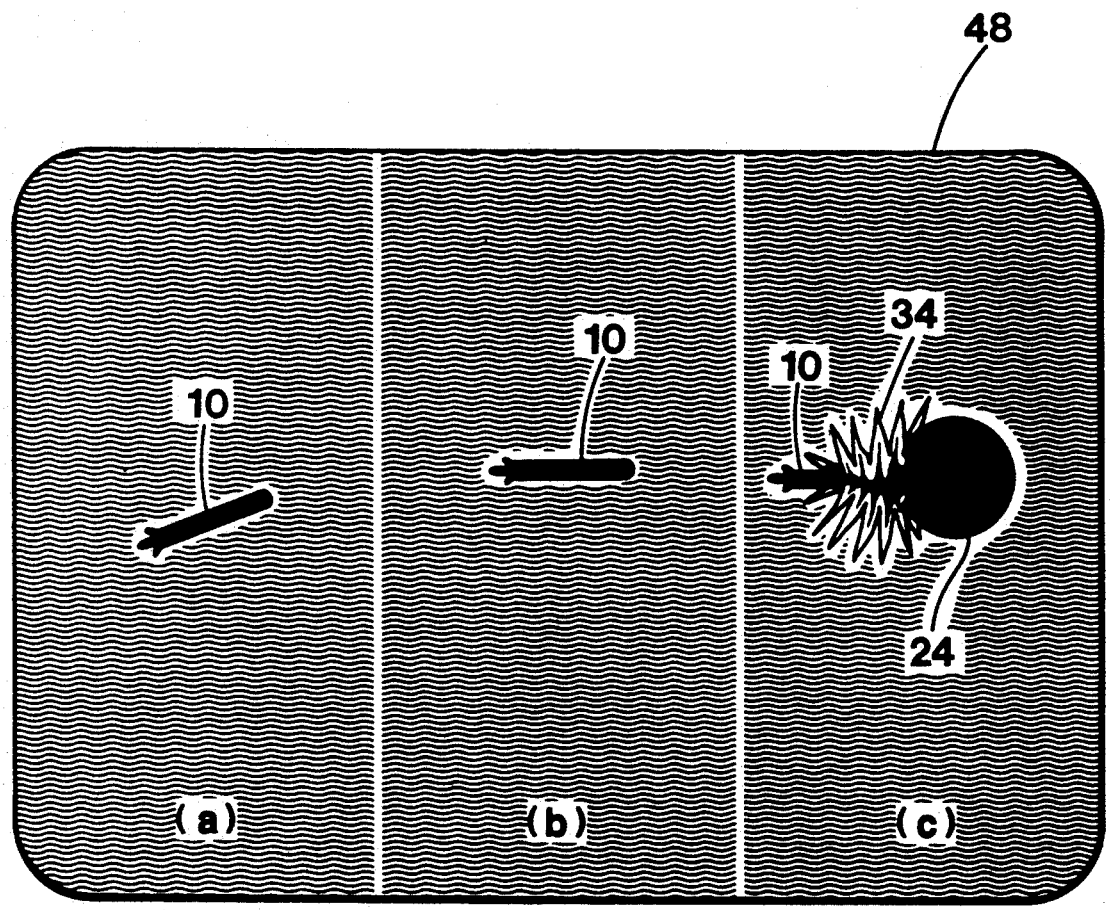
FIG. 2A is a front elevation view depicting the video presentation seen by the console operator in the various modes of deployment shown in FIGS. 1A-1F.
Figure 3A:
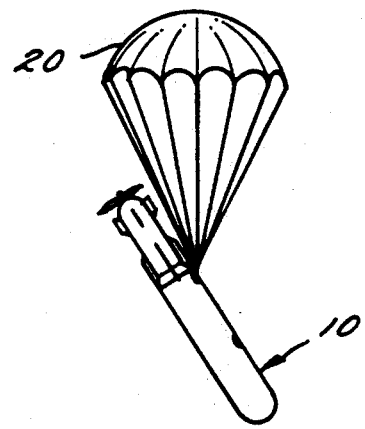
FIGS. 3A through 3D are sequential side elevation views depicting the deployment of the vehicle against a target at depth in accordance with the present invention.
Figure 3B:
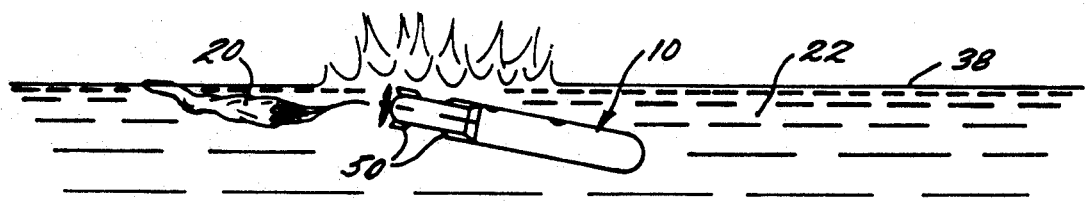
Figure 3C:
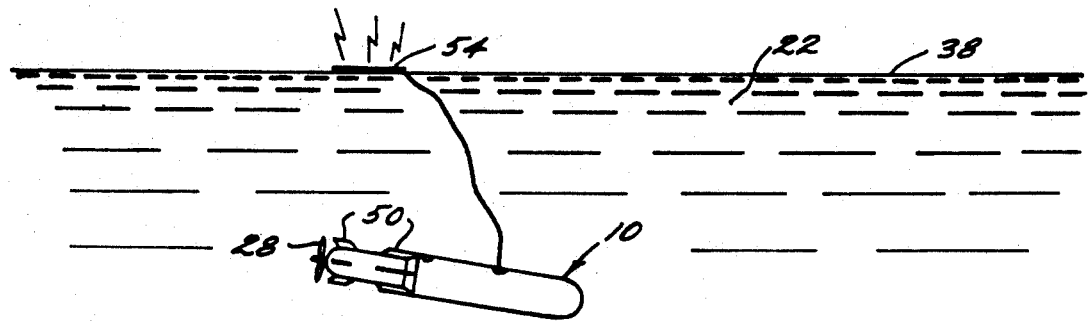
Figure 3D:
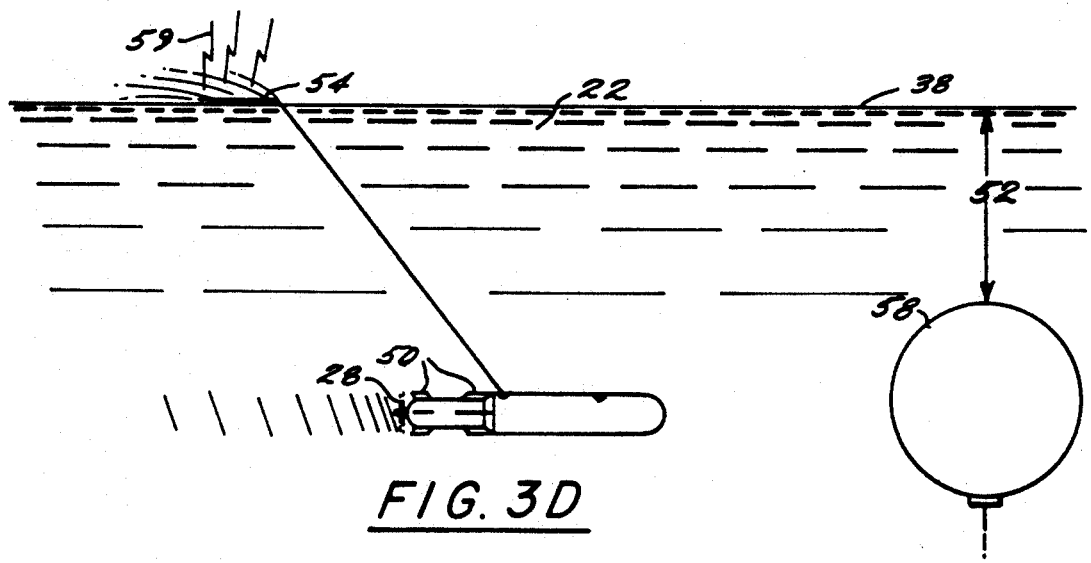

Referring now to FIG. 2, an airborne platform (e.g., helicopter) 12 is shown having an imaging lidar system 36 of the aforementioned type positioned on-board. The lidar imaging system is shown having detected the target 24, determined it to be on the surface 38 of water 12, and is now imaging both the vehicle 10 and the target 24. The illumination 40 from the laser transmitter 42 covers a rectangular area 44 and is gated below the water surface so that the illumination of the underwater region or volume 46 is achieved. Since gated region 46 of illumination is below both target 24 and vehicle 10, both appear as shadows on the video console. In FIG. 2A, sequential depictions are shown (at (a), (b) and (c)), as seen from the console 48 in the platform 12, the vehicle 10 (seen in shadow) is being guided to the target 24 (also seen in shadow) with the console operator sending the appropriate guidance signals to provide course corrections. (These signals are sent to a servo system 48 which operates a vertical rudder 50 shown in FIG. 6). In sequence (c) of FIG. 2A, the vehicle 10 has approached the target sufficiently closely so that the explosive charge is detonated (at 34) thereby destroying the target 24 which then sinks to the bottom of the body of water 22.

In FIGS. 3 and 4, the approach to and destruction of a submerged target (as opposed to the floating target 24 of FIG. 1) is shown. The imaging lidar system has detected a submerged target 58 in the submerged target option. Upon entry into the water 22, the free space in the vehicle will flood causing it to have slightly negative buoyancy and the depth control option will now take over with target depth preset by the console operator. At the same time, a floating antenna 54 deploys after water entry. In FIG. 3A, the drogue chute 20 is fully deployed as the vehicle 10 falls toward the water. Upon entry, as seen in FIG. 3B, the vehicle 10 sheds the drogue chute 20 and commences deployment of the floating wire antenna 54. The pop-up antenna 26 shown previously in FIG. 1, can be deployed or remain housed. In FIG. 3B it has remained housed. In FIG. 3C, vehicle 10 is proceeding downward to target depth, driven by its negative buoyancy and the downward thrust provided by its propellers and the pitch of the horizontal stabilizers 56. The floating antenna 54 is now fully deployed and receiving guidance signals from the platform 12, activating the servo system 48 and moving the rudder 50. In FIG. 4D, vehicle 10 is at the preset (target) depth, has levelled off and is now within close range of the target 58. At the closest point of approach to target 58, the console operator sends the detonation signal 60, and in a short time target 58 will be destroyed. Alternatively, detonation can take place automatically by computer recognition of the closest point of approach or by direct contact.

Figure 4A:
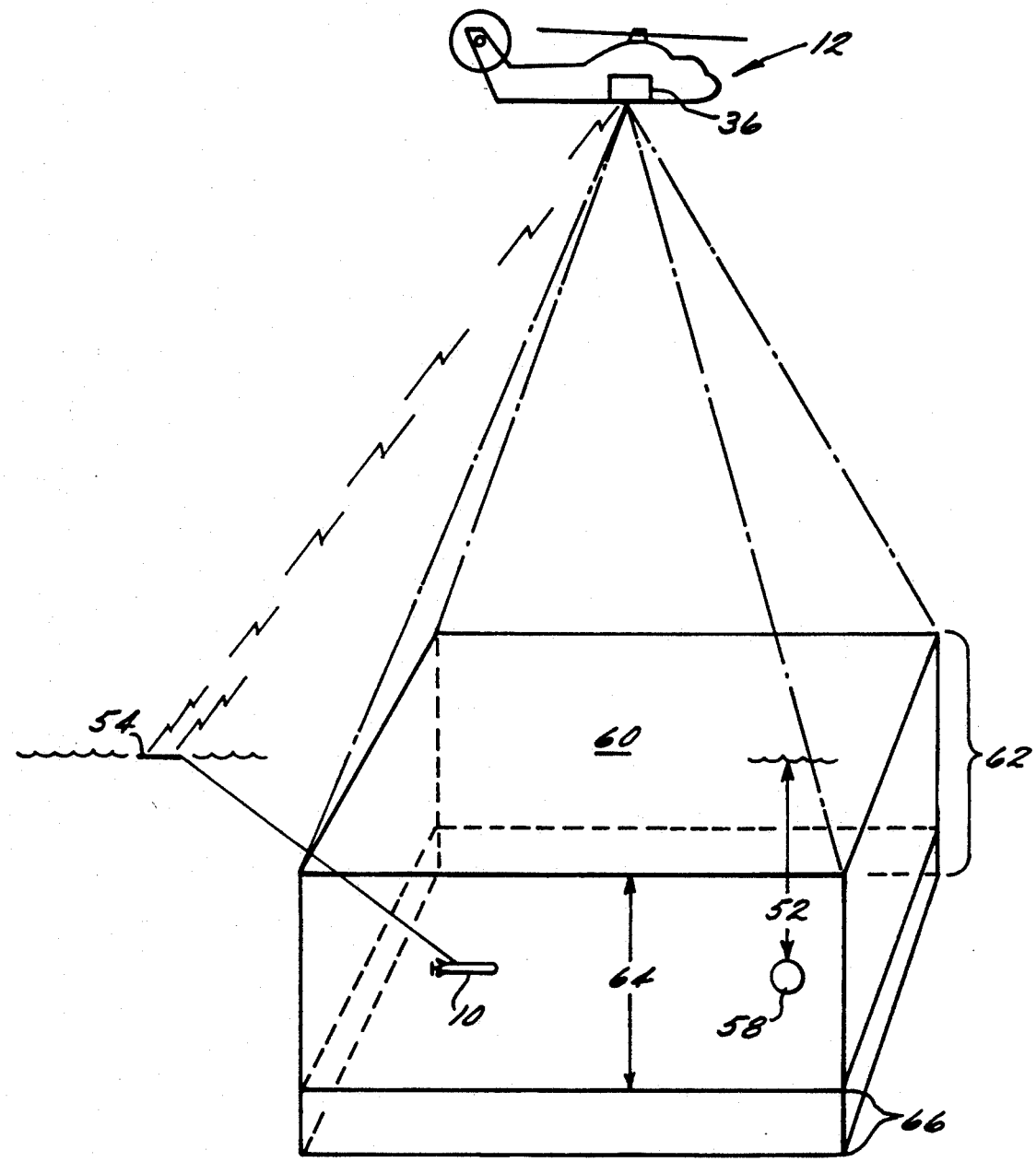
FIGS. 4A through 4B are diagrammatic views showing the use of the lidar imaging system against a submerged target in accordance with the present invention.
Figure 4B:
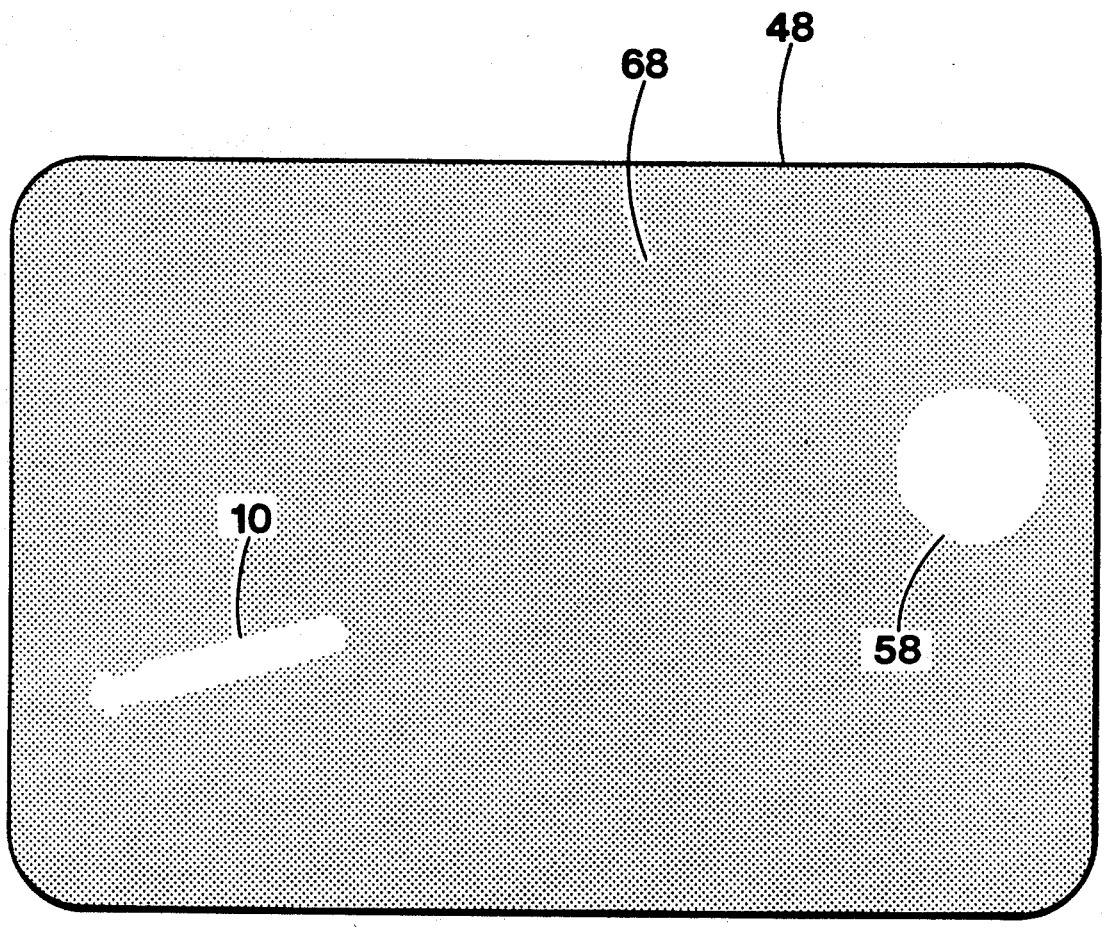

FIG. 4A shows the target 58, platform 12 and vehicle 10 configuration during the submerged approach. The vehicle 10 has reached target depth 52 and is maintained at that depth by the automatic depth control servo system which controls the horizontal stabilizers. The floating wire antenna 54 has been deployed and is receiving rf signals (originated by the console operator) from the platform 12. The imaging lidar system 36 is illuminating an area 60 on the ocean surface and the receiving cameras are gated to view the illuminated region 62. The top of this region 64 is somewhat closer to the surface of the water than the vehicle 10 and target 58; and it is less than the target depth 52. The bottom 66 of the region 62 is below both target 58 and vehicle 10. Thus, the region 62 viewed includes both target 58 and vehicle 10, and they are seen in reflection. This is shown in the video image depicted in FIG. 4B. Here, the target 58 and vehicle 10 appear as bright objects against the gray background 68.

Figure 5:
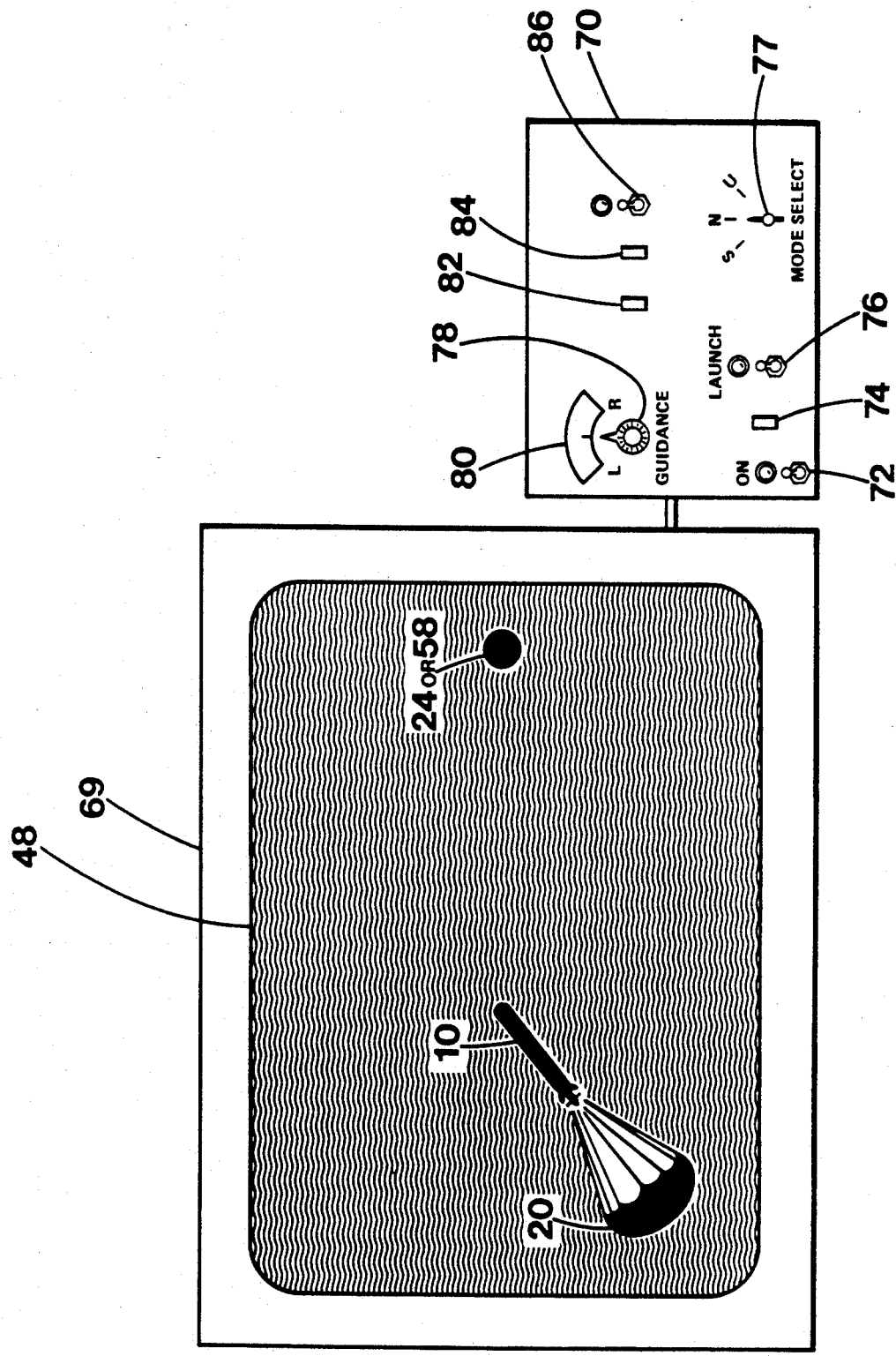
FIG. 5 is a front elevation view depicting the console and the video presentation seen by the console operator in various modes of deployment of the present invention.

The console operator's view is shown in FIG. 5. The video console 69 is positioned in front of the operator from which the operator can see both vehicle 10 and target 24 or 58. Early detection of the vehicle is enchanced by the opening of the drogue chute 20, which is optically opaque, and is readily seen on the screen 48. To the right of the screen is the control panel 70. The control panel has the following settings power 72, launch safety 74, launch 76, mode (surface=S, underwater=U, neutral=N) select 77, guidance 78, rudder angle indicator 80, fusing 82, detonate safety 84 and detonate 86. The surface and underwater settings automatically activate (or deactivate) depth control, flooding, etc., as discussed previously.

Figure 6:
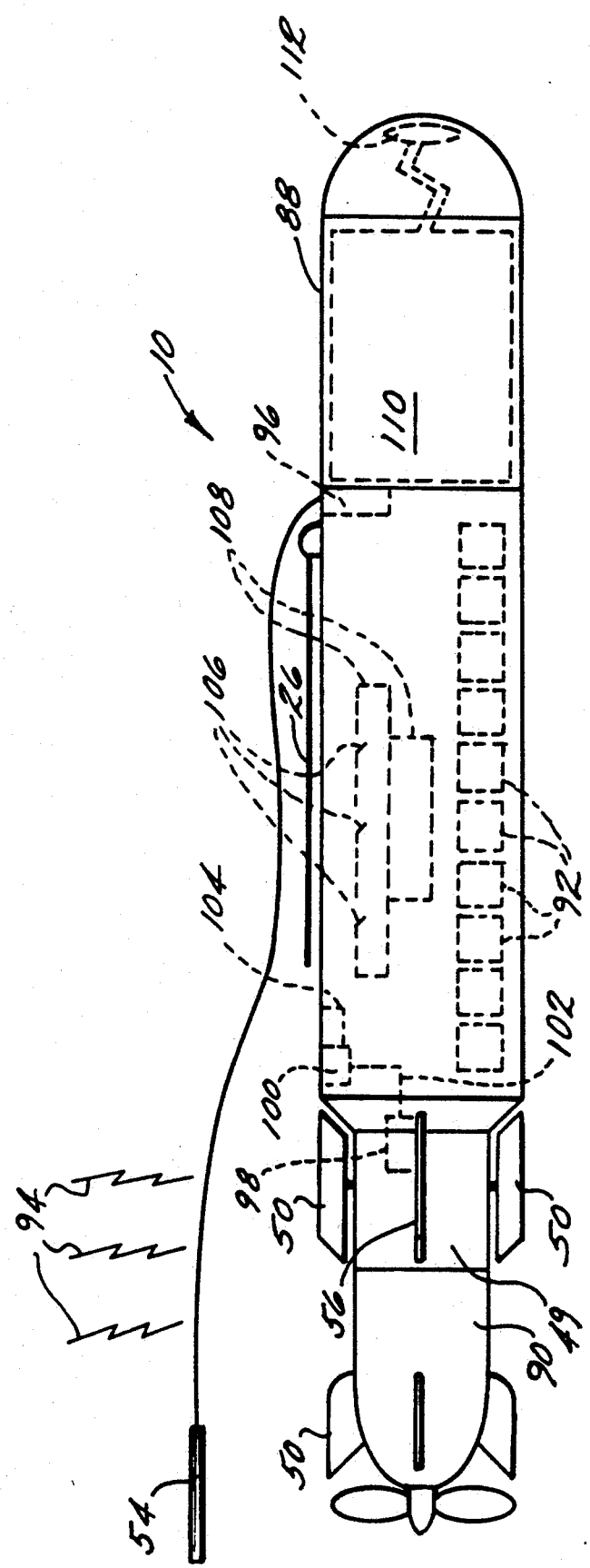
FIG. 6 is a front view, partly in cross-section, depicting a detailed schematic of the vehicle in accordance with the present invention.

FIG. 6 is a detailed schematic of the vehicle 10 and the vehicle housing 88. Propulsion is provided by an 18 pounds of thrust trolling motor 90 (12 VDL, 28A) driven by a bank of 12 V 30A lithium batteries 92. Motor 90 runs continuously upon water entry. The rf signals 94 are received by the antenna 26 or 54 and travel to the receiver 96 and then to the software/control module 98 which provides commands to the servo control 48. The servo control 48 then controls the vertical rudder 50 thereby steering the vehicle. A piezoelectric depth transducer 100 provides its input 102 to the software control module 98. This indication of depth is used by the software control system to control vehicle depth with the servo system 48 operating the horizontal stabilizers 56. The umbilical fitting 104 provides input to the control unit 98, providing the initial settings for underwater or surface operation. The control unit 98 also operates the ports 106 to the free flooding space 108 (again depending on the mode of operation). As mentioned earlier, ports 106 (if used) are closed for surface operation. The surface of the vehicle is preferably at least partially covered by a bright Lambertian reflecting paint so it can be easily imaged down to the required depth, but not so bright as to interfere with the imaging lidar camera gain control. The high explosive 110 in the form of a charge or shaped charge can be detonated on command, or by a contact influence fuse 112 as shown. Preferably, housing 88 has a lengthy of 36 inches and a height of $4\frac{7}{8}$ inches; these dimensions being compatible with presently existing carriers found on rotary wing aircraft.

Figure 7:
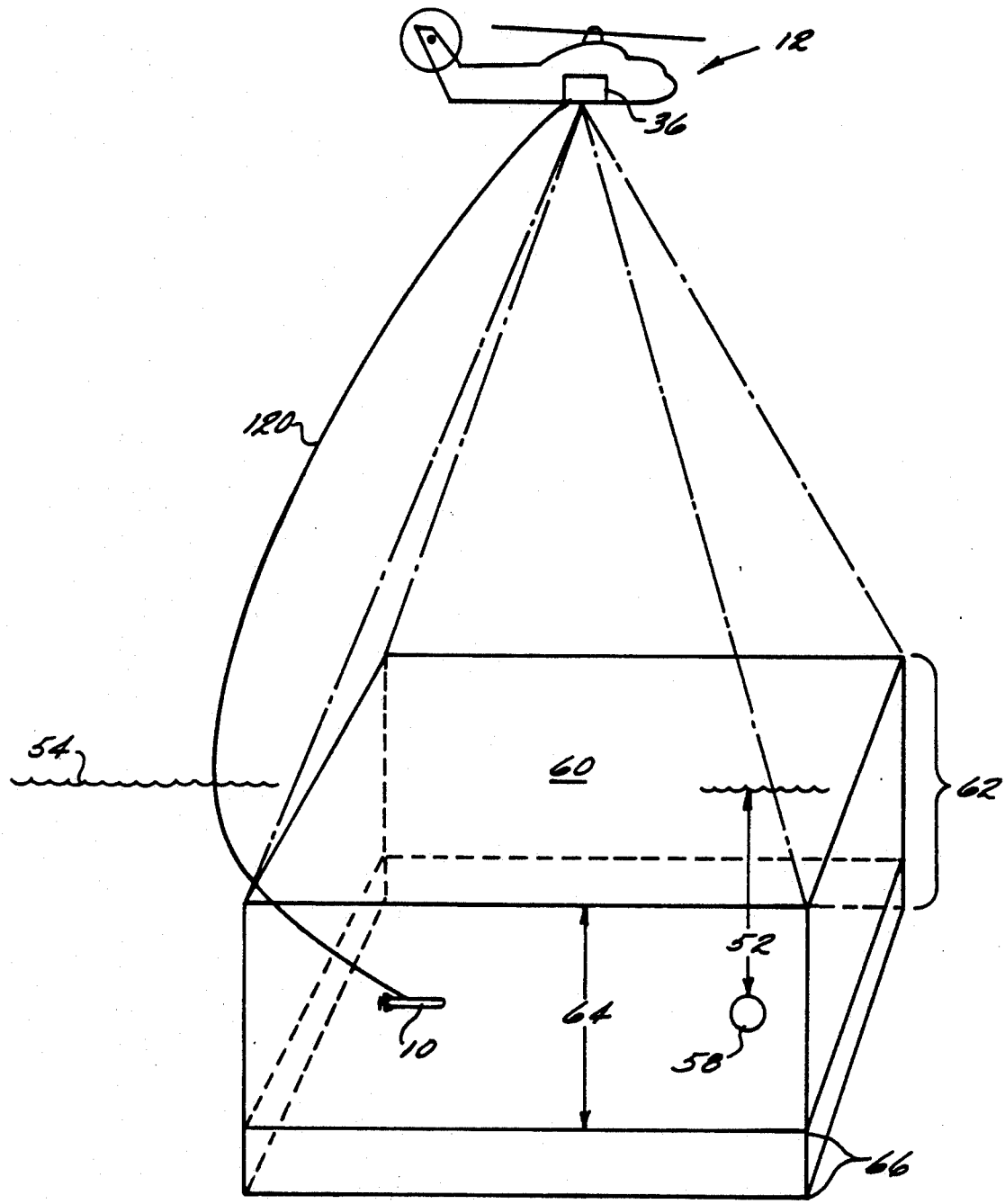
FIG. 7 is a diagrammatic view, similar to FIG. 4A, depicting a fiber optic connection between the airborne platform and the vehicle.

FIG. 7 is a schematic of the present invention similar to FIG. 4A with the significant exception that imaging lidar system 36 is hardwired directly to vehicle 10 using fiber optic cable 120. Use of hardwired cable 120 eliminates the need for either pop-up antenna 26 (see FIG. 2) or floating wire antenna 54 (see FIG. 4A). The use of fiber optic communication (as opposed to Rf communications) leads to many important advantages and benefits. For example, fiber optics permits (1) faster data rates, (2) covert communications and (3) may eliminate the need for an on-board computer (e.g., control module 98 in FIG. 6).

Figure 8:
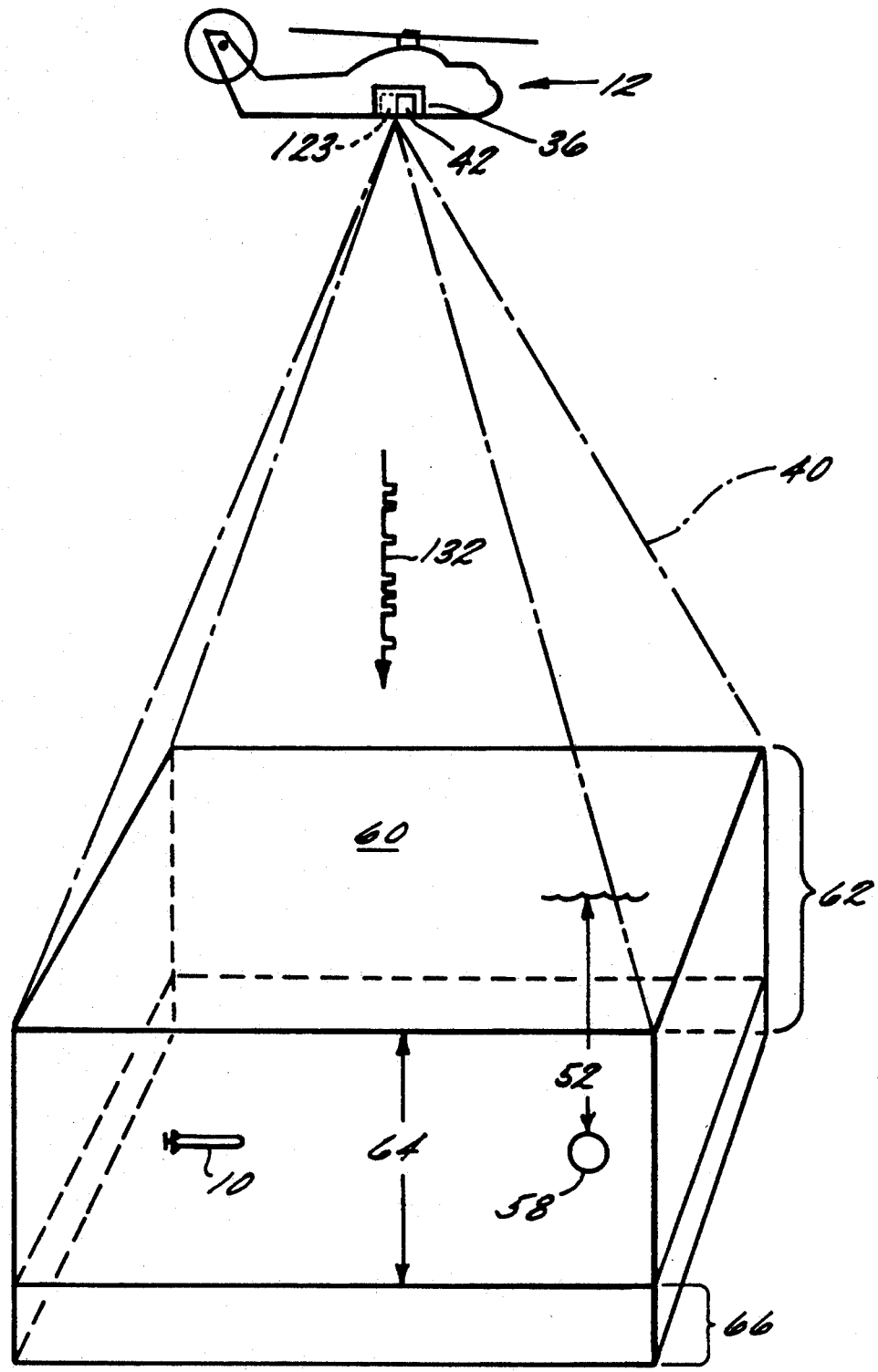
FIG. 8 is a diagrammatic view, similar to FIG. 4A, depicting an optical downlink lidar communications scheme between the airborne platform and the vehicle.

Referring now to FIG. 8, a preferred scheme for communicating between the platform 12 and the underwater vehicle 10 will now be described. FIG. 8 shows the deployment of the vehicle 10 below the surface of the ocean 22. The platform 12 is hovering over the vehicle 10 and the target 58, and the imaging lidar system 36 holds both vehicle 10 and target 58 in view. In accordance with a novel feature of this invention, the laser transmitter 42 is ready to transmit command pulses to the vehicle. The transmitter beam 40 illuminates an area of the ocean 60 and the lidar system 36 is gated so that the volume 62 is viewed on the operator's screen.

Rather than using the imaging laser transmitter 42 to deliver the command signals, a second command laser 123 may be used specifically for the purpose of sending command signals. This second command laser transmitter 123 is boresighted to the imaging laser transmitter 42.

Figure 9:
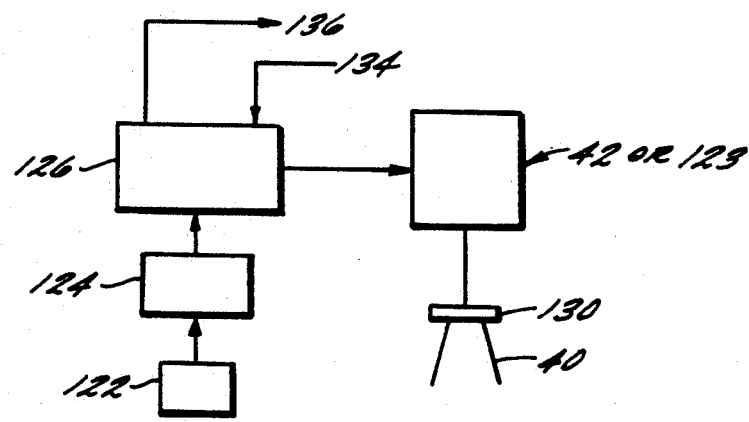
FIG. 9 is a block diagram of a lidar transmitter used in the downlink lidar communications scheme of FIG. 8.

FIG. 9 shows the lidar laser transmitter 42 (or command laser transmitter 123) configured for transmitting commands as well as for its customary mode of imaging beneath the ocean surface. On the command module 122, the various commands are selected. These commands are then passed to the block encoder 124, where they are converted into trigger pulses. These pulses are sent to the pulse timing generator 126. The laser 42 or 123 with optics 130 is pumped by diodes or flashlamps. The pulse timing generator 126 also times the Q-switch to fire the laser at the precise time required for the encoded commands. The commands are carried down to the vehicle in the beam 40 as a train of pulses 132 (see FIG. 8). The pulse timing generator 124 also receives synchronization pulses 134 and transmits gate pulses 136 to the cameras in the imaging lidar system.

Figure 10A:
FIGS. 10(a) and 10(b) are diagrams depicting lidar pulse trains carrying command signals.
Figure 10B:
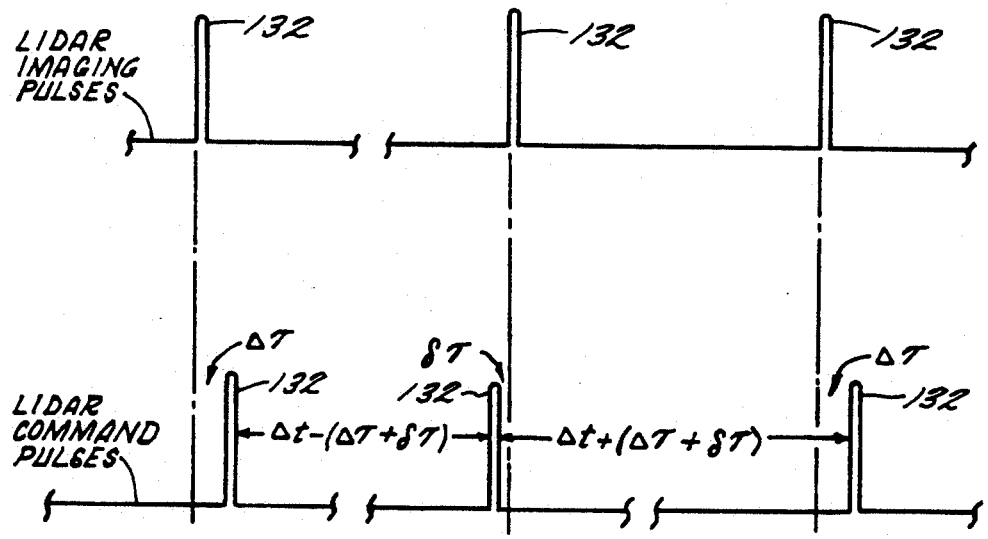

FIGS. 10(a) and 10(b) shows the basic principle of pulse spacing modulation as applied to this embodiment of the present invention. In FIG. 10(a), a train of imaging pulses 132 are shown (not to scale) for the purpose of illustrating the concept. It is assumed that these pulses 132 are of short duration (i.e., 29 nsec) and run at a nominal pulse repetition rate i.e., 20 Hz. Pulses 132 are spaced 50 msec apart corresponding to a 20 Hz pulse repetition rate (prr). Typically, the pulse timing and laser discharge stability is available with current state-of-the art equipment, with a timing noise or "jitter" of less than 1 nsec. FIG. 10(b) represents an encoded pulse train in which information, (e.g., commands) is encoded by shifting the pulses 132 $\Delta\tau$ or $\delta\tau$ seconds from their nominal position in time. The pulses 132 are alternately delayed and transmitted early, by an amount $\Delta\tau$ and $\delta\tau$, respectively. Therefore, they are spaced at intervals of $\Delta t - (\Delta\tau + \delta\tau)$ and $\Delta\tau + (\Delta\tau + \delta\tau)$, respectively, as shown in the drawing. Upon arrival at the vehicle 10, these pulse trains 132 are interpreted as commands. It should be borne in mind that the "bins" or various time increments and decrements which are chosen, must be larger than the inherent system pulse trigger jitter, and large enough to minimize the effects of pulse stretching during propagation. Other encoding embodiments may also be used with the present invention, for example, binary systems in which a series of synchronization bits may be used to set the synchronization as will be shown in FIGS. 12-16 as well as options using $\Delta\tau$ and $\delta\tau$ only, or various other multilevel time shifts in order to optimize bandwidth utilization.

It will be appreciated that when utilizing separate imaging and command laser transmitters 42 and 123, the encoding (e.g., pulse spacing modulation) may be accomplished independently. That is, the psm encoding of the command laser 123 may be entirely separate and unrelated to the pulse spacing of the pulsed imaging lidar transmitter 42.

Figure 11:
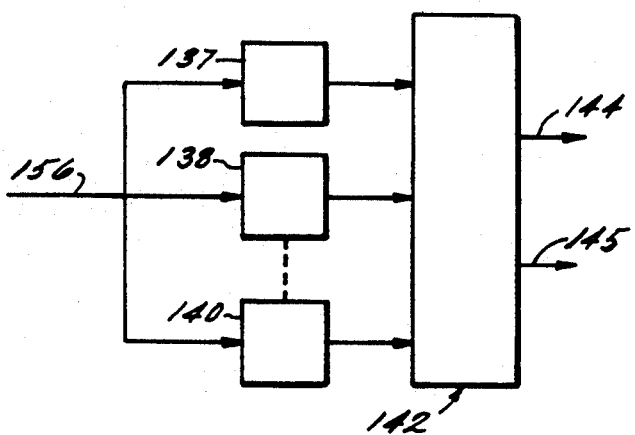
FIG. 11 is a block diagram of a decoder for decoding command signals on the vehicle.
Figure 15:
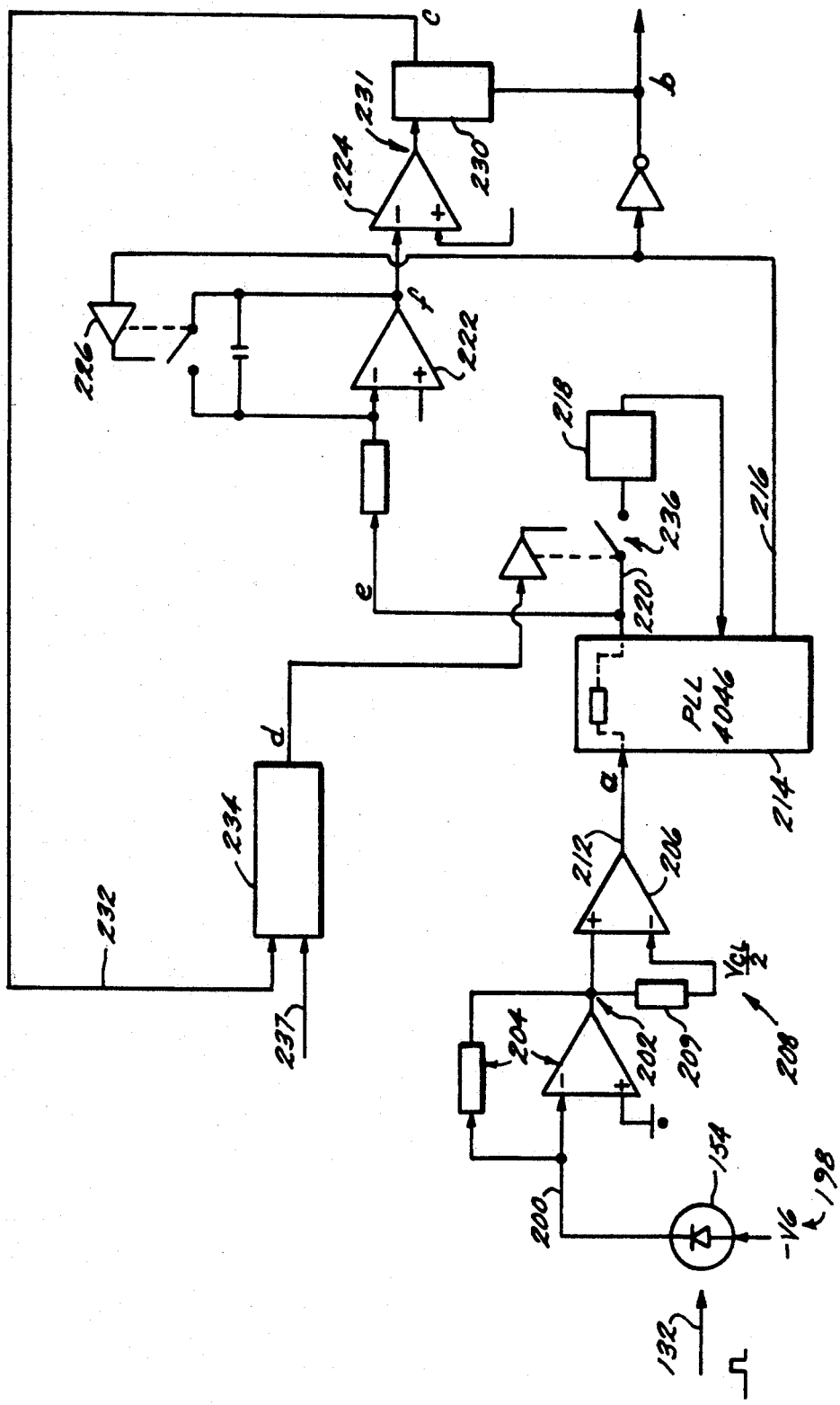
FIG. 15 is an electrical block diagram depicting a receiver/decoder.

FIG. 11 is a diagram of the decoding loop aboard the vehicle 10. It consists of the electrical pulse input 134 from the photodetector (see item 154 in FIG. 12), and sent, with the proper delay, to the first interval counter 136, the second interval counter 138, and further (Mth interval) counters 140. In this process, decoding comprises a comparison over each interval in the maximum comparator 142 which selects the word corresponding to the maximum count. The word then becomes a command transmitted down channels 144 and/or 145, for example, ordering the vehicle to perform certain operations. The embodiment described in FIG. 11 may be susceptible to error propagation. However, in conditions where the signal to noise ratio (SNR) is relatively high, this should not be a significant problem. In any event, an improved embodiment which eliminates this problem is shown in FIG. 15 which describes a phase locked loop circuit.

Figure 12:
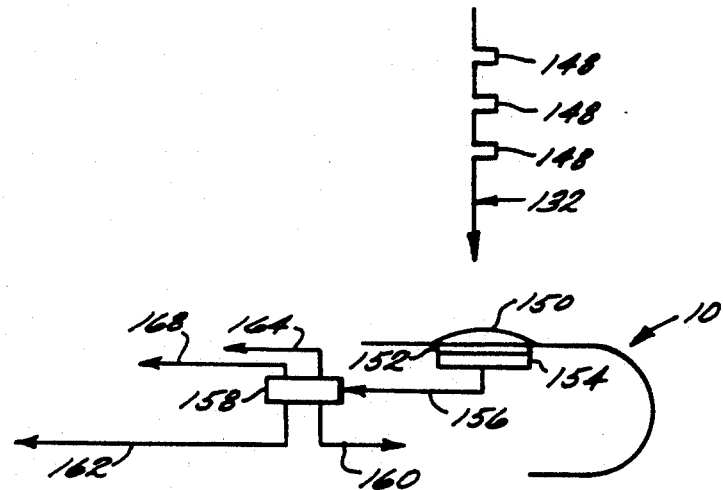
FIG. 12 is a schematic diagram of a portion of the underwater vehicle showing the decoder input to the rudder, stabilizer and motor of the vehicle.

FIG. 12 shows the decoder of FIG. 11 in place in the vehicle 10. The pulse train 132 consisting of the individual pulses 148 enters the vehicle 10 through waterproof optics 150. Pulses 148 pass through the notch filter 152 where sunlight is filtered out, and strike the photodiode 154. The resultant electrical signal 156 is transmitted to decoder 158 where the particular pulse spacing modulation is decoded, interpreted by the vehicle's computer and then translated into commands 160 to the detonator, 162 to the motor, and 164 and 168 to the rudder and horizontal stabilizer. Other than the elements shown in FIG. 12, the remaining part of vehicle 10 is as shown in FIG. 6.

Figure 13A:
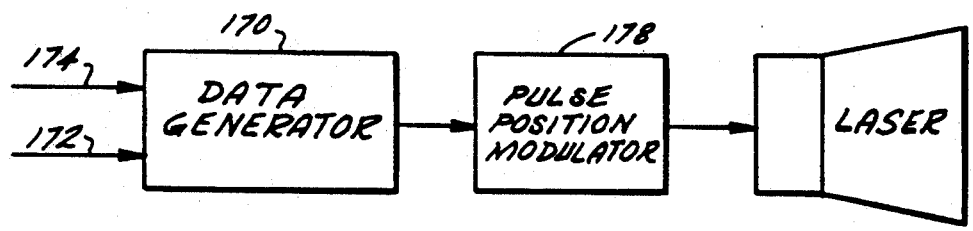
FIG. 13(a) is a block diagram depicting the transmitter encoder.
Figure 13B:
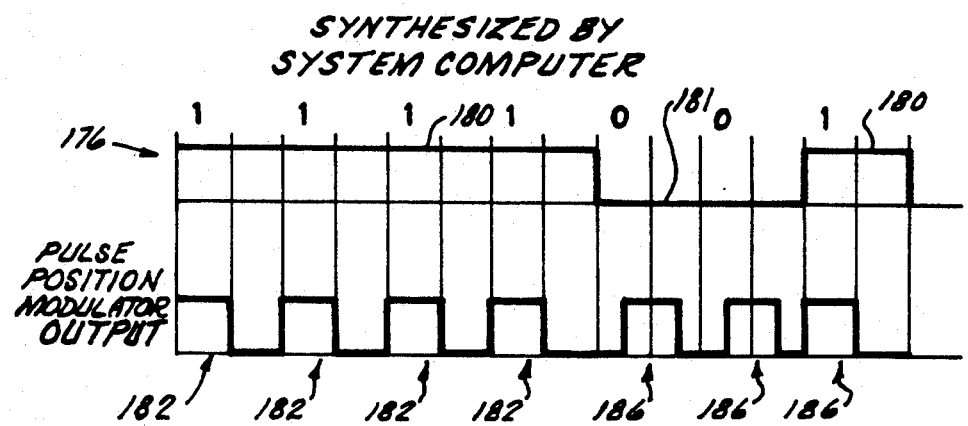
FIG. 13(b) is a binary encoded output from the transmitter encoder of FIG. 13(a)

FIG. 13(a) is a block diagram of the transmitter encoder associated with the imaging lidar system 36 onboard the platform 12. The timing of the transmitted laser pulses is controlled by the data generator 170, with power input 172 and command input 174. The command input can be "neutral", that is directing no temporal change to the normal output of the imaging pulses; or it can be coded to give any one of a number of commands in sequence. The data generator output 176, shown in FIG. 13(b), is binary. That is, it provides an output of either "1" or "0". This produces an output from the pulse position modulator 178 which provides a trigger pulse of variable spacing to the laser transmitter. Thus, pulse spacing modulation is provided. In the embodiment shown in FIG. 10(b), there are just two positions; the normal synchronized position corresponding to the pulse separation $\Delta\tau$, and one of the two alternate positions, $\Delta\tau$ and $\delta t$. In the case of FIG. 10(b), there were three bins, corresponding to the timing intervals $\Delta t - (\Delta\tau + \delta\tau)$ and $\Delta t + (\Delta\tau + \delta\tau)$.

As many bins as practical can be utilized; for example, with eight bins, the raw bit rate is three times the prr. Because of the low bit rate required for commands to the underwater vehicle, as compared to a lengthy message, only two bins are required. In this case, the raw bit rate is equal to the prr. The actual bit rate is less than the prr, because of the communications protocols required. The data generator outputs 176 appear as binary signals "1" (shown at 180) of amplitude "1" or binary signals "0", (shown at 181) of amplitude "0". The "1" signal 180 is a command to the pulse position modulator 178 to maintain normal pulse spacing 182; the command "0" 181 is a command for phase shift (in the frequency domain) which is equivalent to a signal 186 with a desired time delay. This time delay is analogous to the $\delta\tau$ of FIG. 10(b). The pulse position modulator output 182 provide triggers for the normally spaced pulses "1". Outputs 186 are displaced from the normal spacing and correspond to the data generator output "0"; and this is how the decoder will interpret this change in spacing. This situation will be shown in FIGS. 14 and 15.

Figure 14:
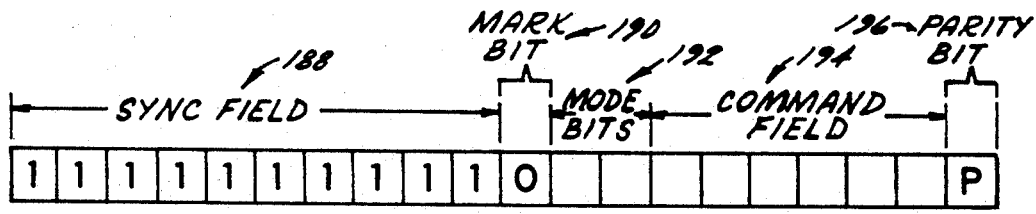
FIG. 14 is a diagram depicting the communications protocol for the optical downlink lidar communications scheme of FIG. 8.

FIG. 14 shows the details of the communications protocol used for the transmission of commands by the technique shown in FIG. 10. The purpose of the protocol is to provide a basis whereby the decoder circuit can recognize signals for both normal imaging operation, and commands to the vehicle 10, when action by vehicle 10 is desired. The protocol consists of 20 binary data bits. There are ten synch bits and ten data bits. Transmission is continuous with each packet representing a command or the absence of a command. For example, with a laser transmitter pulse repetition rate of 40 Hz, two commands could be sent per second, a more than adequate command rate for the present invention. The "Synch Field" 188 is a train of 10 pulses (of "normal" timing; i.e., unshifted in time) for phase locked loop timing acquisition. The Mark Bit 190 marks the end of the synch field, and prepares the decoder for a command to follow. The Mode Bits 192 select the type of action desired. These can be trigger commands with a code 00, change depth command 01 (not used when depth control is automatic) and 10, a change course command. The Command Field 194 is a signed six bit integer or a command code. These codes include polarity and magnitude of both turn and depth change, as well as delay of expolsive detonation from time of signal receipt. Finally, the Parity Bit 196 is used to detect data errors or loss of synch.

Referring now to FIG. 15, the receiver-decoder electrical schematic diagram for a phase locked loop decoding scheme is shown. The light from the laser pulse 132 enters the photodetector 154, with applied bias voltage 198. The light 132 is converted into a photocurrent 200 which in turn is converted to a voltage 202 by the transimpedance amplifier 204. The voltage at 202 is then compared at 206 to a reference voltage 208 which can be provided as a fixed reference (i.e., $V_{cc}/2$) or from an envelope follower 209 which tracks the peak signal voltage amplitude at 202 and derives a reference voltage therefrom. The latter threshold extraction method provides for continuing detection of fading signals. By the aforementioned method, the pulse position modulated signal transmitted by the laser transmitter is reconstructed at the output 212 of comparator 206. In order to interface the signal to the vehicle's computer, the pulse position modulated signal at 212 must be decoded which means that clock and data must be extracted therefrom.

Figure 16:
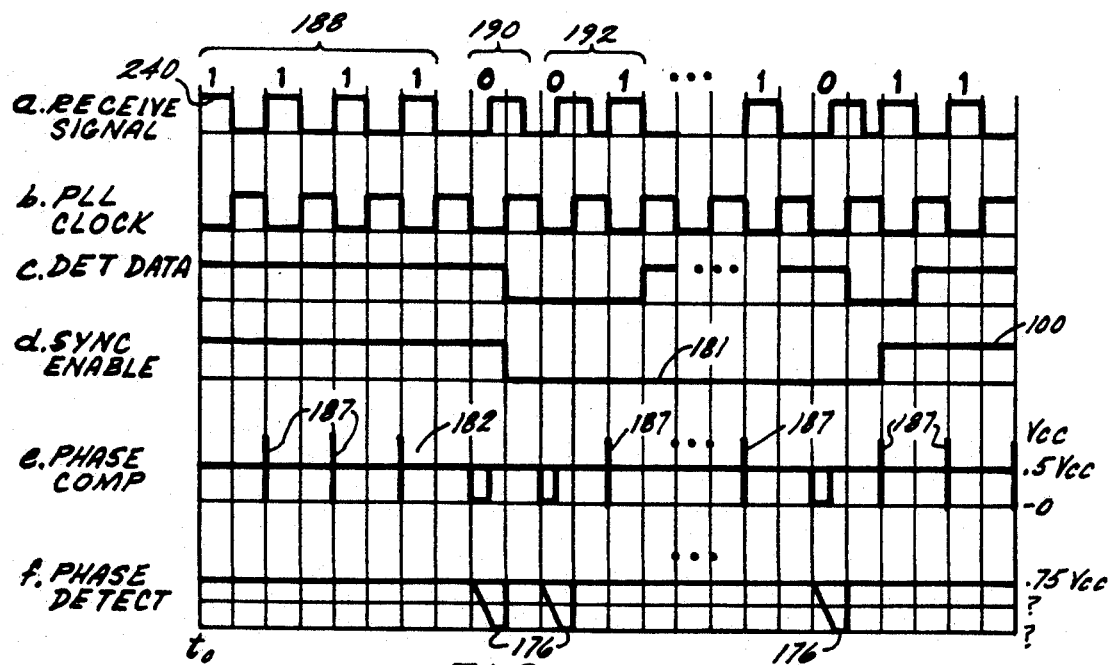
FIG. 16 is a pulse timing diagram for the receiver/decoder of FIG. 15.

In order to present procedures for data extraction, reference will be made to the wave forms of the decoder timing diagram, in FIG. 16. The letters a, b, c, d, e and f in FIG. 15 indicate the locations at which the waveforms of the decoder timing diagram FIG. 16 are taken. During the passage of the synchronization field 188 of FIG. 14 (the point a of FIGS. 15 and 16), the phase locked loop (PLL) 214 locks in phase to the incoming waveform at point a, and runs a closed loop mode, with switch 236 closed and the loop filter 218 active. Each incoming pulse at point a is compared in phase (i.e., arrival time with the PLL clock at 216 (point b inverted) and a corresponding phase error pulse is issued at the PLL phase comparator output 220 (point e). This phase comparator output is integrated during each half of a cycle by a gated integrator 222 and applied to a threshold comparator 224 in order to decide if there is enough energy in a phase comparator pulse to detect a code zero or if the energy is low enough to detect a code 1. The gating of the integrator is controlled by the PLL output clock through an analog switch 226 which enables the integrator during the first half of the cycle and quickly discharges the integrator during the second half. The detected code bit at 231 is sampled by the rising edge of the PLL clock (point b) and latched by a D flip/flop 230 (point c). Upon detecting the first data code 0 following a synch field, this information is fed back through line 232 to a PLL coast control single shot block 234. This single shot causes the synch enable line (point d) to open analog switch 236 thus opening the entire loop and allowing the PLL to coast for the next consecutive 10 bits during the passage of the mode bits, data bits and parity bits, so that the comparator errors caused by the encoded data do not degrade the PLL synchronization. Following the parity bit, the coast control single shot 234 "times out" and the PLL returns to the synchronization mode until the arrival of the next mark bit. At this time, the whole cycle repeats. The data and clock output extracted at points b and c are sent to the vehicle computer which translates the data packets into executable commands. Each packet contains a parity bit which is used to detect data transmission errors. If a high number of parity bit errors are detected, the vehicle's computer determines that synchronization has been lost and overrides the coast control single shot through control line 236, forcing the PLL to return to the synchronization acquisition mode. This detector of the present embodiment is not limited to just two bins or levels. It is easily adaptable to accept multibin or multilevel encoded signals. The PLL described herein can also be replaced by an alternate embodiment which can be configured to ignore phase errors due to coded data pulses such as those used in data recording systems, increasing synchronization reliability and data throuphput rate.

In FIG. 16, the receiver decoder timing diagram is provided. This diagram shows the progress of the signals through points a through f as shown on the schematic given in FIG. 15. A transmitted signal is received and detected, appearing at a in FIG. 15, as the wave form 240. The Synch Field 188, described in FIG. 16 appears at a given point in time $t_o$ (arbitrarily chosen) indicating continuous operation with the receiver and underwater vehicle standing by, awaiting a command. The Mark Bit 190 is then received, preparing the system for a command. The Mode Bits 192 then follow, ordering a particular command, such as "change course" or "change depth". The following polarity and dimension bits are represented by the symbols . . . A polarity bit follows immediately after the Mode Bits, giving a "polarity" to be applied to the command such as "up" or "down" for "change depth" and "left" or "right" for "change course". The "dimension bits", order a magnitude such as "full rudder", "half rudder" for rudder angle, or "full rise" or "half rise" for vertical control plane surfaces.

Note that these commands may be interpreted by the vehicle as the magnitude of deflection of a control surface, or the time duration of a surface preset to operate at a specific deflection, when ordered. These bits are the command bits of the command field 194 of FIG. 14. At the end of this transmitted command is the parity bit, which detects a data transmission error. The PLL clock pulse timing is an output at point b, which originates at PLL 4046 as an output 216 shown in FIG. 15. It is a relative time standard, but it is always present and is used to derive a phase error by comparison with the incoming signal at a. It, in fact, derives its timing from the incoming signal and is established when the signal is in the synch mode. It retains its synchronism during the course of the coded transmissions. Point c shows the detector output, a result of the comparison of the signals at a and b. Point d reflects the condition of the PLL during the synch phase, when its condition 180 reflects reception of the incoming synch pulses and the period 181 during which the PLL is configured to pass commands, while the clock continues to oscillate at the synch frequency. Point e is a comparison of the phases at a and b. This signal is integrated and produces the output c which is the signal that is finally electromechanically converted to a command for the vehicle to obey. Note that the spikes 182 are integrated out and do not appear at f because of their short duration.

It will be appreciated from the above description that a novel technique has been described by which a lidar imaging system can be used to control and direct an underwater vehicle to a given location or target in the ocean. The use of an imaging lidar system provides a clear and continuous view of both vehicle and target and provides automatic or preset target depth input to the vehicle. The use of the novel imaging lidar downlink eliminates such attachments as a pop-up antenna or other more cumbersome embodiments such as a despooling antenna or fiber optic wire deployed from the vehicle. This antenna must float at or slightly below the surface at all times, and is subject to breakage during deployment, despooling and towing, as well as exerting drag and changing torque and moment on the vehicle, which must be compensated for. In addition to the elimination of an antenna, the use of the lidar imaging downlink eliminates the requirement for a radio frequency downlink on the platform.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Apparatus for removal of navigational hazards in the water from a platform positioned above the water, comprising:
   (1) a discrete vehicle detachably attachable to said platform, said vehicle including;
      (a) propulsion means for moving said vehicle in water;
      (b) directional guidance means for directionally maneuvering said vehicle in water;
      (c) explosive means for detonating said vehicle at a selected navigational hazard;
      (d) control means for controlling said directional guidance means; and
      (e) communications means for communicating navigational instructions to said control means;
   (2) imaging sensor means positioned on said platform, said imaging sensor means providing images of both a selected navigational hazard and said vehicle; and
   (3) optical lidar downlink means for optical transmission of navigational instructions to said communications means of said vehicle, said navigational instructions being responsive to said images from said imaging sensor means.

2. The apparatus of claim 1 wherein:
said platform comprises an airborne platform.

3. The apparatus of claim 1 wherein:
said control means also controls said explosive means; and
wherein said optical lidar downlink means also transmits instructions to said communications means regarding detonation of said explosive means.

4. The apparatus of claim 1 wherein:
said communications means comprises photodetector means.

5. The apparatus of claim 1 wherein:
said imaging sensor means comprises imaging lidar sensor means.

6. The apparatus of claim 5 wherein said imaging lidar means comprises:
means for selectively generating imaging pulses of light using transmitter means;
means for projecting said short pulses of light toward water and at a navigational hazard disposed in a target volume at least partially enveloped by the water;
gated camera means for receiving said pulses of light reflected back from said target volume after a time delay corresponding to the round-trip propagation time of said light pulses to and from said target volume using receiver means; and
means for converting said received pulses of light to a video image of said navigational hazard in said target volume.

7. The apparatus of claim 6 wherein:
said transmitter means of said imaging lidar sensor means generates navigational instructions in the form of command pulses for said optical lidar downlink means in addition to generating said imaging pulses.

8. The apparatus of claim 7 wherein:

said command pulses are encoded using pulse space modulation.

9. The apparatus of claim 8 wherein said pulse space modulation comprises:
means for shifting the pulse timing of said command pulses relative to said imaging pulses.

10. The apparatus of claim 8 wherein said pulse space modulation comprises:
pulse position modulator means;
means for inputting a binary encoded command to said pulse position modulator means wherein the output from said pulse position modulator means triggers said transmitter means.

11. The apparatus of claim 6 including:
a discrete command transmitter means for generating navigational instructions in the form of command pulses for said optical lidar downlink means.

12. The apparatus of claim 1 wherein said communication means includes:
optical command pulse decoding means.

13. The apparatus of claim 12 wherein said optical command pulse decoding means comprises:
photodetector means for receiving said optical transmission and converting said optical transmission to electrical command signals;
a plurality of interval counter means for receiving said electrical command signals; and
comparator means for comparing the electrical signal from each interval counter means and deriving the navigational instructions.

14. The apparatus of claim 12 wherein said optical command pulse decoding means comprises:
photodetector means for receiving said optical transmission and converting said optical transmission to electrical command signals; and
phase locked loop circuit means for receiving said electrical command signals and converting said electrical command signals to navigational instructions.

15. A method of removing navigational hazards in the water comprising the steps of:
releasing a discrete maneuverable vehicle into a body of water from a platform, the vehicle including explosive means for detonating said vehicle at a selected navigational hazard;
using imaging sensor means positioned on said platform to obtain an image of said released vehicle and a selected navigational hazard;
controlling the direction of movement of said vehicle from said platform based on image input from said imaging sensor means wherein said vehicle is directed to a vicinity at or near the selected navigational hazard and wherein said explosive means is detonated to remove said navigational hazard; and
using optical lidar downlink means to direct said vehicle movement.

16. The method of claim 15 wherein:
said platform comprises an airborne platform 17. The method of claim 15 wherein:
said control means also controls said explosive means; and
wherein said optical lidar downlink means also transmits instructions to said communications means regarding detonation of said explosive means.

18. The method of claim 15 wherein:
said communications means comprises photodetector means 19. The method of claim 15 wherein:
said imaging sensor means comprises imaging lidar sensor means.

20. The method of claim 19 wherein said imaging lidar means comprises:
means for selectively generating imaging pulses of light using transmitter means;
means for projecting said short pulses of light toward water and at a navigational hazard disposed in a target volume at least partially enveloped by the water;
gated camera means for receiving said pulses of light reflected back from said target volume after a time delay corresponding to the round-trip propagation time of said light pulses to and from said target volume using receiver means; and
means for converting said received pulses of light to a video image of said navigational hazard in said target volume.

21. The method of claim 20 wherein:
said transmitter means of said imaging lidar sensor means generates navigational instructions in the form of command pulses for said optical lidar downlink means in addition to generating said imaging pulses.

22. The method of claim 21 wherein:
said command pulses are encoded using pulse space modulation.

23. The method of claim 22 wherein said pulse space modulation comprises:
means for shifting the pulse timing of said command pulses relative to said imaging pulses.

24. The method of claim 19 including:
a discrete command transmitter means for generating navigational instructions in the form of command pulses for said optical lidar downlink means.

25. The method of claim 22 wherein said pulse space modulation comprises:
pulse position modulator means;
means for inputting a binary encoded command to said pulse position modulator means wherein the output from said pulse position modulator means triggers said transmitter means.

26. The method of claim 15 wherein said communication means includes:
optical command pulse decoding means.

27. The method of claim 26 wherein said optical command pulse decoding means comprises:
photodetector means for receiving said optical transmission and converting said optical transmission to electrical command signals;
a plurality of interval counter means for receiving said electrical command signals; and
comparator means for comparing the electrical signal from each interval counter means and deriving the navigational instructions.

28. The method of claim 26 wherein said optical command pulse decoding means comprises:
photodetector means for receiving said optical transmission and converting said optical transmission to electrical command signals; and
phase locked loop circuit means for receiving said electrical command signals and converting said electrical command signals to navigational instructions.

29. An apparatus for removing navigational hazards in the water comprising:
a discrete maneuverable vehicle releasable into a body of water from a platform, the vehicle including explosive means for detonating said vehicle at a selected navigational hazard;
imaging sensor means positioned on said platform to obtain an image of said released vehicle and a selected navigational hazard;
optical lidar downlink means for controlling the direction of movement of said vehicle from said platform based on image input from said imaging sensor means wherein said vehicle is directed to a vicinity at or near the selected navigational hazard and wherein said explosive means is detonated to remove said navigational hazard.

* * * * *